(12) United States Patent
Brockel et al.

(10) Patent No.: US 6,459,176 B1
(45) Date of Patent: Oct. 1, 2002

(54) SURVIVAL RADIO BATTERY ADAPTERS

(75) Inventors: Kenneth H. Brockel, Neptune, NJ (US); Peter J. Rathemacher, Highlands, NJ (US); Fenton K. Yip, Edison, NJ (US); Douglas B. Howe, Toms River, NJ (US); Marc D. Gietter, Jackson, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 110 days.

(21) Appl. No.: 09/723,527

(22) Filed: Nov. 28, 2000

(51) Int. Cl.$^7$ ................................................. H01M 2/10
(52) U.S. Cl. ............................ 307/150; 455/90; 429/99
(58) Field of Search .......................... 307/150; 361/814; 429/96–100, 121, 176, 179, 185; 455/347–349, 351, 575, 90, 95

(56) References Cited

U.S. PATENT DOCUMENTS

| | | | | | |
|---|---|---|---|---|---|
| 2,506,524 | A | * | 5/1950 | Stuck | 307/149 |
| 4,407,911 | A | * | 10/1983 | Hooke | 429/159 |
| 4,709,201 | A | * | 11/1987 | Schaefer et al. | 320/112 |
| H985 | H | * | 11/1991 | Christopulos | 429/7 |
| 5,197,889 | A | * | 3/1993 | Rizzo et al. | 429/99 |
| 5,526,526 | A | * | 6/1996 | Clark et al. | 455/100 |
| 5,628,054 | A | * | 5/1997 | Osaka | 455/127 |
| 5,665,485 | A | * | 9/1997 | Kuwayama et al. | 174/52.3 |
| 5,683,831 | A | * | 11/1997 | Baril et al. | 429/100 |
| 5,973,476 | A | * | 10/1999 | Irvin | 307/150 |
| 5,980,310 | A | * | 11/1999 | Bourel et al. | 429/96 |
| 6,007,941 | A | * | 12/1999 | Hermann et al. | 429/100 |

* cited by examiner

Primary Examiner—Fritz Fleming
(74) Attorney, Agent, or Firm—Michael Zelenka; George B. Tereschuk

(57) ABSTRACT

A survival radio battery adapter is provided for survival equipment to operate with commercially available rechargeable batteries sealed in a rugged, watertight battery compartment. The survival radio battery adapter comprises a battery compartment, an adapter coupler, an adapter means having surge protection, voltage regulator and voltage conversion devices, with the adapter coupler being connected to the battery compartment and the battery compartment containing sufficient commercially available rechargeable batteries. The battery compartment is configured to provide a watertight seal when closed. The preferred embodiment is an AN/PRC-90 survival radio battery adapter. In another embodiment, this invention provides a survival radio battery adapter for the AN/PRC-112 D survival radio comprising a battery compartment connected directly to the survival radio, with a surge protection device being included in the battery compartment, and other power management devices already included in the survival radio so that it operates with commercially available rechargeable batteries. This invention also provides battery adapters for survivability equipment.

49 Claims, 4 Drawing Sheets

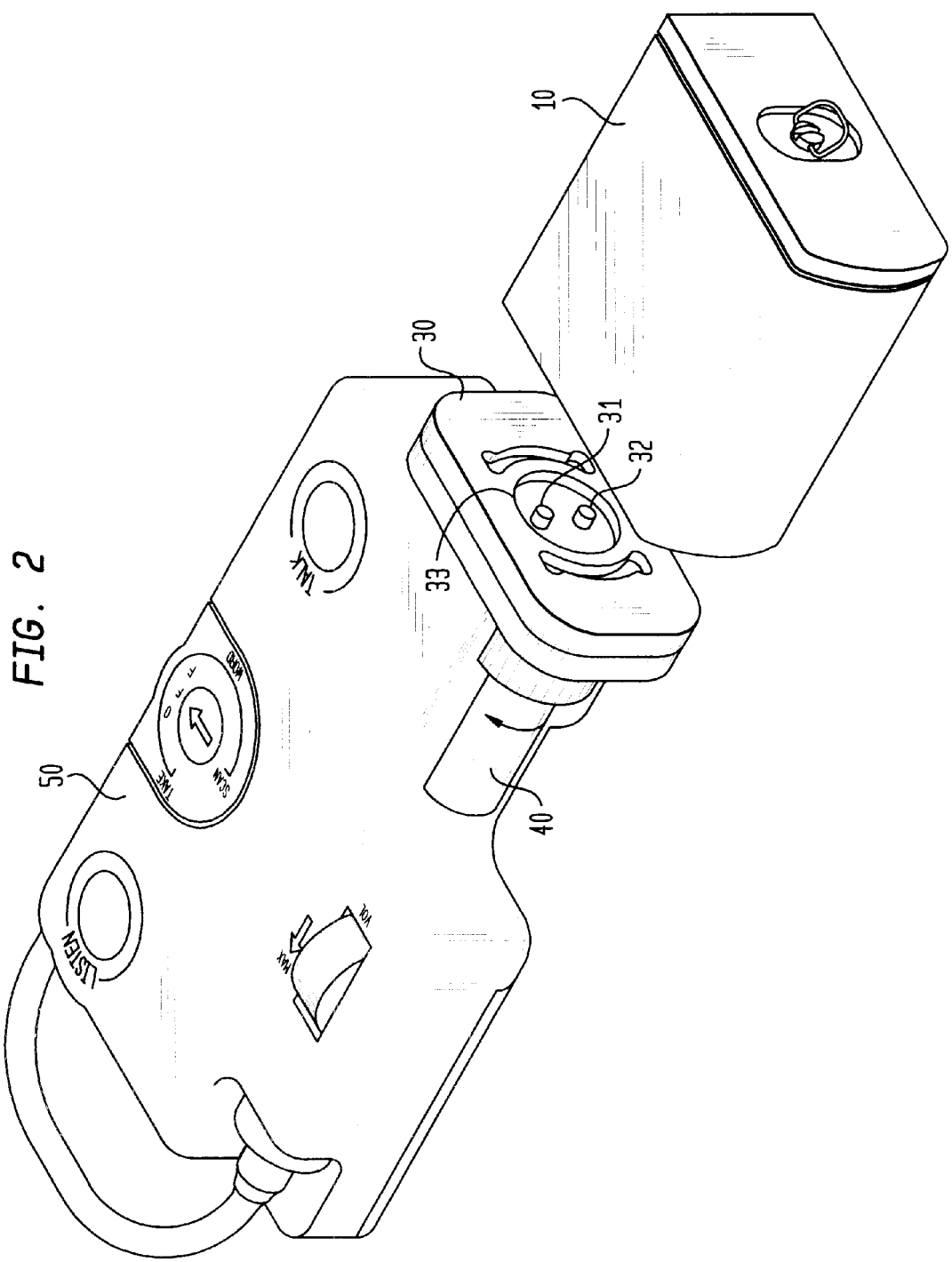

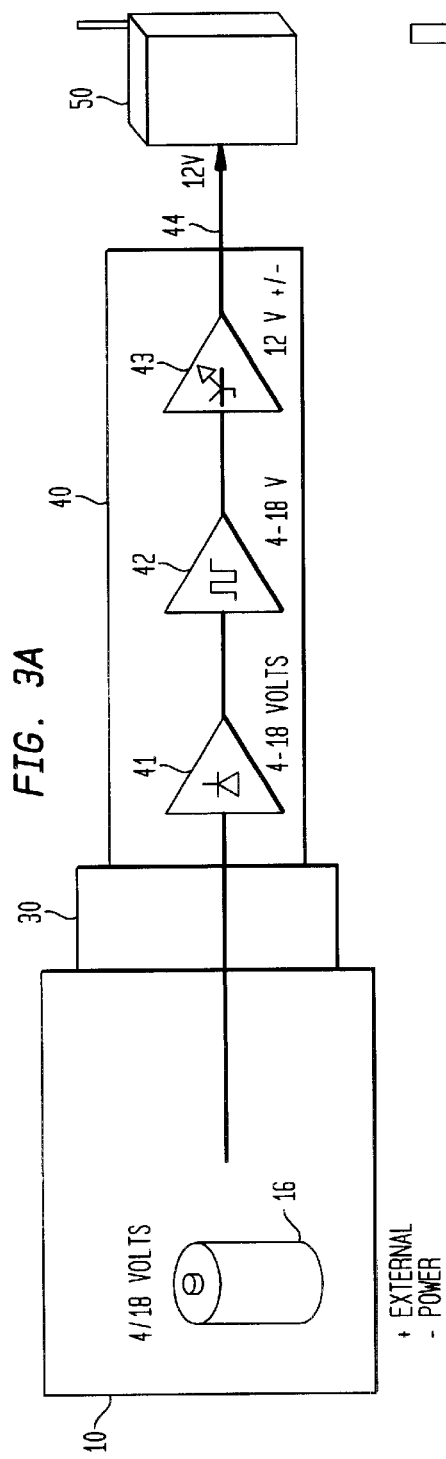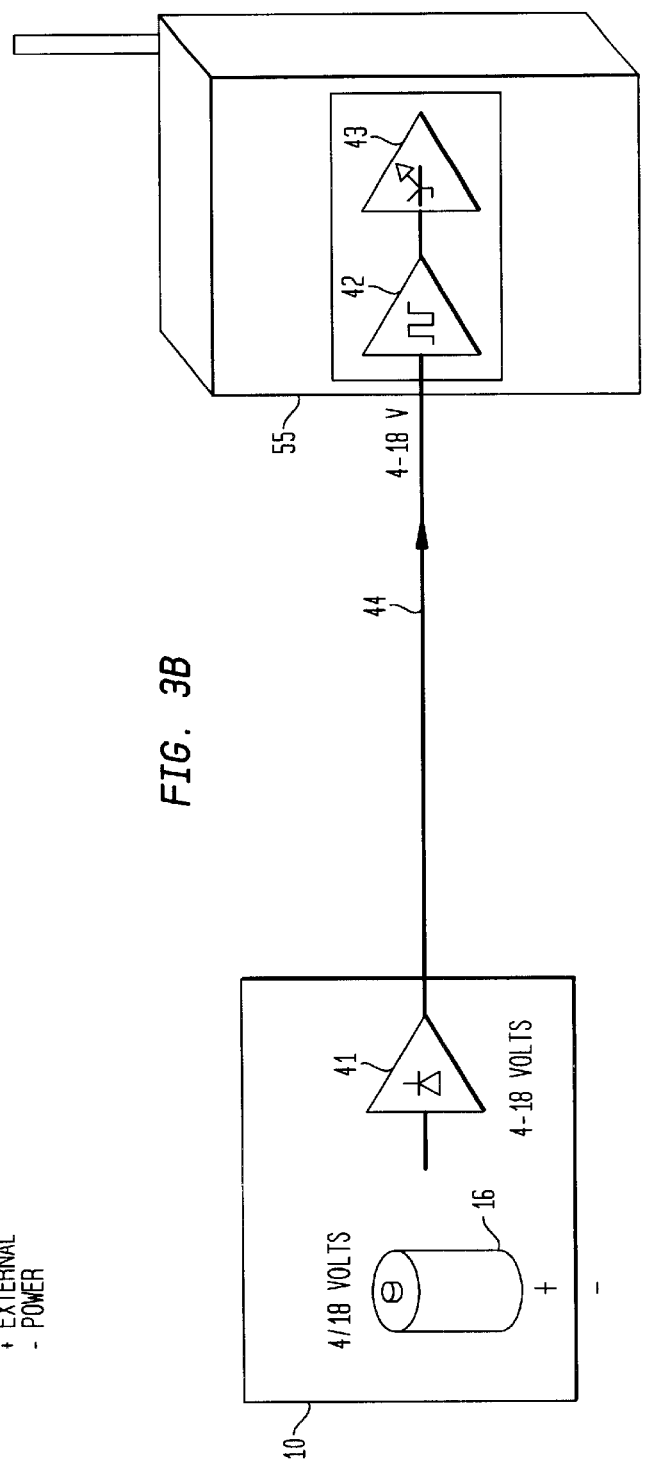

SURVIVAL RADIO BATTERY ADAPTERS

GOVERNMENT INTEREST

The invention described herein may be manufactured, used and licensed by or for the Government of the United States of America without the payment to me of any royalties thereon.

BACKGROUND OF THE INVENTION

1. Field of the Invention

This invention relates in general to the field of electrochemical power sources. More particularly, the present invention relates to a series of battery adapters allowing for survivability equipment to be operated with commercial batteries.

2. Background of the Invention

The military services have employed non-rechargeable batteries for airborne survivability equipment, such as survival radios. Survival radios provide critical rescue locator information for pilots and aircraft crew stranded in dangerous locations. Non-rechargeable batteries can be used only once and then must be discarded. The critical need for reliable airborne survival radios requires a sizeable inventory of nonrechargeable batteries and large battery replacement costs. Providing reliable electrical power for airborne survivability equipment with non-rechargeable power sources has led to a number of disadvantages, shortcomings and limitations.

One solution to the limitations of non-rechargeable power sources, which will also increase the probability of safer pilot rescue, is to provide power for airborne survival equipment for significantly longer time periods than possible with non-rechargeable batteries. Such a solution would also lower the cost of operating and maintaining different types of survival equipment and survival radios.

Several alternative power sources have been investigated. For example, solar cells are now being tested as a source of energy for these radios. It is the last source of energy that a pilot would use after battery sources of energy have been drained. The solar cells, while limited in use, would enhance the probability of a successful rescue mission, but solar cells are generally expensive. Similarly, other existing sources of energy, such as zinc air power packs and fuel cells might reduce battery costs and, working in conjunction with solar cells, may extend the time a pilot can operate survivability equipment/radio. Solar cells provide a potential solution to the power needs for survivability equipment, however a number of other solutions have also been explored.

Commercially available batteries could offer numerous advantages as a low cost source of reliable electrical power, but they have never been utilized in the demanding airborne equipment survivability equipment. Significant cost reductions for the military departments would be obtained if non-rechargeable survival radios batteries were replaced with proven rechargeable battery technology. Since rechargeable batteries are by their very nature reusable, they reduce the overall demand for non-rechargeable batteries. This lowers both the acquisition, supply and disposal costs associated with rechargeable battery use. The resulting cost benefits from employing commercial batteries include reduced field demand for non-rechargeable batteries and reduced inventory at the unit and depot level, making the commercial battery more cost effective and fully mission capable with greater reliability.

However, neither commercial batteries nor their associated chargers and cables are compatible with airborne survivability equipment designed to meet demanding critical performance and environmental parameters. The long-felt need for a reliable power source that is compatible with the demands of airborne survivability equipment has been met by providing a group of battery adapters that allow airborne survivability equipment to operate with commercially available rechargeable batteries. This invention's preferred embodiment combines the battery adapters of the present invention with the AN/PRC-90 and AN/PRC-112 A-C survival radios to provide additional battery capabilities and significant cost advantages, without suffering from the disadvantages, shortcomings and limitations of non-rechargeable batteries. None of the prior art survival equipment power systems include a rugged container compatible with commercially available batteries and an adapter that includes surge protection, voltage regulation and voltage conversion devices.

The two main survival radios used by the military departments today are the AN/PRC-90 and the AN/PRC-112. The prior art power source for the AN/PRC-90 is the military unique BA-5368 non-rechargeable battery. Similarly, the prior art power source for the AN/PRC-112 radio is the military-unique BA-5112 non-rechargeable battery. The battery adapters of the present invention allow replacing those current non-rechargeable BA-5368 and BA-5112 batteries with a rechargeable battery configuration that also reduces energy costs. Adding a rugged folding solar panel or introducing a reserve zinc-air battery to supplement the rechargeable battery can both add additional critical survivability.

The AN/PRC-90 survival radio battery adapter of the present invention comprises a battery compartment, a coupler and an adapter assembly to connect the battery compartment to the radio, with the battery compartment containing commercially available rechargeable batteries, such as 10 1.5-volt zinc/KOH/$MnO_2$ battery cells in a rugged, waterproof compartment. The AN/PRC-90 adapter assembly also includes a number of circuits and devices for conserving battery strength. The prior art survival equipment power systems do not provide commercially available batteries and an adapter that includes surge protection, voltage regulation and voltage conversion devices encased in a rugged container.

One variation to the AN/PRC-90 survival radio battery adapter is to attach the battery compartment directly to the AN/PRC-112 D survival radio so that this radio can also operate with commercial batteries. The battery compartment fits both survival radios and provides them with a rugged waterproof environment.

SUMMARY OF THE INVENTION

The general object of the invention is to provide an airborne survivability equipment battery adapter that allows airborne survivability equipment to operate with commercially available rechargeable batteries.

Another object of the invention is to provide an airborne survivability equipment battery adapter that allows airborne survivability radios to operate with commercially available rechargeable batteries.

A further object of the invention is to provide an airborne survivability equipment battery adapter for the AN/PRC-90 airborne survivability radio to operate with commercially available rechargeable batteries.

A still further object of the invention is to provide an airborne survivability equipment battery adapter for the AN/PRC-112 airborne survivability radio to operate with commercially available rechargeable batteries.

A more particular object of this invention is to provide an airborne survivability equipment battery adapter for the AN/PRC-90 airborne survivability radio to operate with commercially available rechargeable batteries with an adapter assembly that also includes a number of circuits and devices for conserving battery strength, to provide significant additional battery capabilities and the significant cost advantages from using commercially available batteries, without suffering from the disadvantages., shortcomings and limitations of non-rechargeable batteries.

Until now, survival equipment power systems have not included a rugged container compatible with commercially available batteries and an adapter that includes surge protection, voltage regulation and voltage conversion devices.

Accordingly, the aforementioned objects can be attained by providing an AN/PRC-90 survival radio battery adapter comprising a battery compartment, an adapter coupler, an adapter means having surge protection, voltage regulator and voltage conversion devices, with the adapter coupler being connected to the battery compartment containing sufficient commercially available re-chargeable batteries. In another embodiment, this invention provides an airborne survivability equipment battery adapter for airborne survivability equipment comprising the same battery compartment devices so that the AN/PRC-112 survivability radio operates with commercially available rechargeable batteries, but with a different configuration of power management devices.

BRIEF DESCRIPTION OF THE DRAWINGS

These and other objects, features, advantages and details of the present invention will become apparent in light of the ensuing detailed disclosure, and particularly in light of the drawings.

FIG. 2 is a perspective drawing of the survival radio battery adapter of the present invention connected to an AN/PRC-90 survival radio.

FIG. 3A is a conceptual block diagram depicting the AN/PRC-90 embodiment of the survival radio battery adapter of the present invention.

FIG. 3B is a conceptual block diagram depicting the AN/PRC-112 D embodiment of the survival radio battery adapter of the present invention

DETAILED DESCRIPTION OF THE DRAWINGS

Figure 1A:
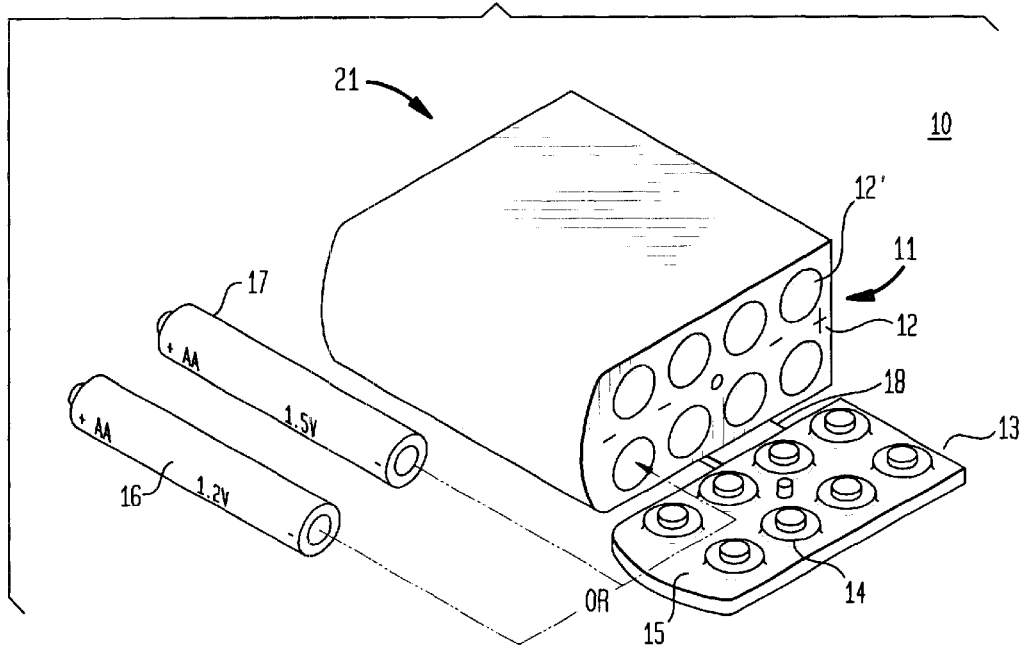
FIG 1A is a perspective drawing of the survival radio battery adapter battery compartment of the present invention in the opened position and two AA commercial battery cells.
Figure 1B:
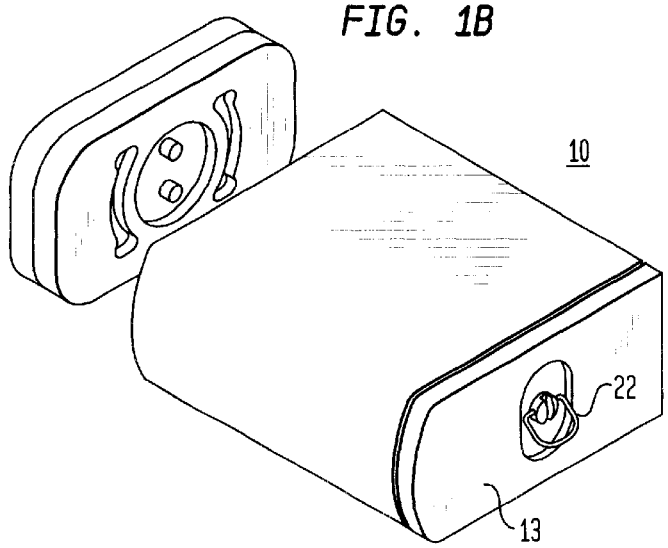
FIG 1B is a perspective drawing of the survival radio battery adapter battery compartment and coupler means of the present invention.

FIGS. 1A and 1B, are perspective drawings of the AN/PRC-112 survival radio battery compartment 10 of the present invention in the open and closed positions. Referring now to FIG. 1A, battery compartment 10 comprises a chamber 11, an insert 12 having a plurality of apertures 12', a door 13, a group of sealing rings 14 disposed on the Inside surface 15 of door 13 and batteries 16 and 17 to be inserted into apertures 12'. The hinge 18 is both the hinge for the door 13 and includes wires and cables, not shown, to carry electrical current to positive and negative contacts 19 and 20, respectively, shown in FIG 1C, located on the upper surface 21 of compartment 10. Compartment 10 is constructed with rugged material sufficiently strong to survive the impact of an air crash and can be rectangularly shaped. Referring back to FIG. 1A, insert 12 is depicted with sufficient apertures 12' for 8 commercially available batteries but other inserts for different numbers and sizes of batteries can also be employed. The number and size of apertures 12' for insert 12 can be varied according to the sizes and types of batteries to be installed. Batteries 16 and 17 can be either commercially available rechargeable or commercially available primary batteries.

Figure 1C:
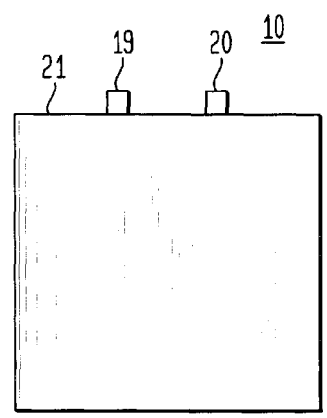
FIG. 1C is an orthographic front view of the survival radio battery adapter battery compartment of the present invention along with positive and negative contacts.

Referring now to FIG. 1B, where like numerals are employed for like structural elements, battery compartment 10 is depicted with door 13 in the closed position and a locking screw 22 for door 13 seals compartment 10. Compartment 10 is shown next to a means for coupling 30, which will be described in more detail in connection with FIG. 2. Compartment 10 is constructed of a waterproof material such as Lexan®, a carbon fiber or equivalent and both compartment 10 and door 13 are configured to fit snugly and provide a watertight seal to protect the batteries within compartment 10 and make electrical contact with the batteries inserted into the compartment 10. Once door 13 is closed the battery compartment 10 is then sealed watertight to survive an emergency water landing and not short. FIG. 1C is a front view of compartment 10 depicting positive and negative contacts 19 and 20, respectively, and top surface 21.

In one embodiment of this invention, battery compartment 10 can be installed directly on an AN/PRC-112 D survival radio. Referring now to FIG. 2, this drawing depicts the preferred embodiment of this invention with an AN/PRC-90 survival radio 50. In FIG. 2 battery compartment 10 is connected to the means for coupling 30 having a pair of contact points 31 and 32, which communicate with positive and negative contacts 19 and 20, respectively, depicted in FIG. 1C, and a twist locking means 33 to fixedly connect the compartment 10 to the coupling means 30. Coupling means 30 is connected to a means for adapting 40, which in turn permits connecting the entire power system to survival equipment such as the AN/PRC-90 survival radio 50 preferred embodiment.

FIG. 3A is a conceptual block diagram, employing like numerals for like structural elements, depicting a battery 16 in a compartment 10 connected to coupling means 30 and the adapter means 40, which performs a number of power management functions before supplying electrical current, indicated by arrow 44 to an AN/PRC-90 survival radio 50. In accordance with the present invention, adapter 40 includes a surge/polarity protector 41, a voltage conversion device 42 and a voltage regulator device 43. Together these devices insure that the survival radio's ability to protect the downed pilot during a mission will not be impeded by unanticipated electrical problems such as water intrusion and intermittent power interruption resulting from the harsh operational environment a crashed pilot is likely to encounter. None of the prior art survival equipment power systems include a rugged container compatible with commercially available batteries and an adapter that includes surge protection, voltage regulation and voltage conversion devices. By including the power management techniques such as the surge/polarity protector 41, voltage conversion device 42 and voltage regulator device 43, the adapter means 40 protects the survival equipment from adverse conditions like reverse polarity and power surges.

For the sake of comparison, FIG. 3B is a conceptual block diagram depicting a battery 16 in compartment 10 connected directly to an AN/PRC-112 D survival radio 55. The AN/PRC-112 D survival radio already includes circuits for a voltage conversion device 42 and a voltage regulator device 43 to perform those power management functions within the survival radio 55. In this embodiment, the compartment 10 includes a surge/polarity protector 41 device employed before supplying electrical current, indicated by arrow 44 to the voltage conversion device and voltage regulator circuits, 42 and 43 respectively, within the AN/PRC-112 D survival radio 55. As in other embodiments of the present invention, other inserts for different numbers and sizes of batteries can also be selected according to the sizes and types of batteries to be installed.

Figure 4:
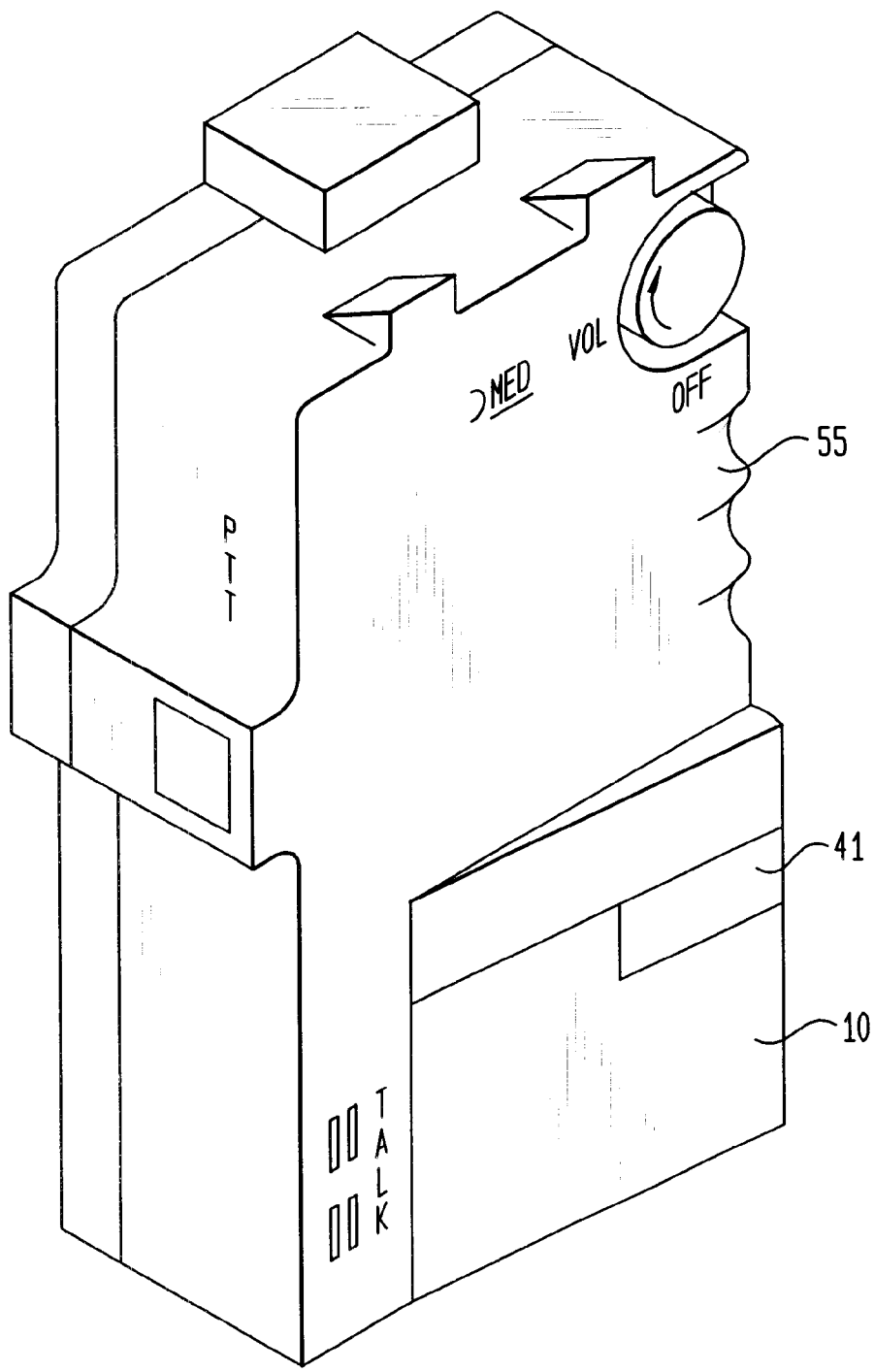
FIG. 4 is a perspective view depicting a battery compartment of the present invention connected to an AN/PRC-112 D survival radio.

FIG. 4 is a perspective drawing that depicts compartment 10 installed directly on an AN/PRC-112 survival radio 55. Box 41 is the surge/polarity protector device within compartment 10.

A number of variations and modifications of the battery adapters of the present invention are within the contemplation of the present invention. For example, the size, shape and configuration of the insert can be varied to accommodate varied cell types like AAA and 123 photocells. Additionally, the preferred embodiment's AN/PRC-90 survival radio configuration can also be employed with the AN/PRC 112 A-C series of survival radios. Further, the size, shape and configuration of the insert can be also be varied to accommodate changing energy and interface requirements.

It is to be further understood that other features and modifications to the foregoing detailed description are within the contemplation of the present invention, which is not limited by this detailed description. Those skilled in the art will readily appreciate that any number of configurations of the present invention and numerous modifications and combinations of materials, components, arrangements and dimensions can achieve the results described herein, without departing from the spirit and scope of this invention.

Accordingly, the present invention should not be limited by the foregoing description, but only by the appended claims.

What we claim is:

1. A survival equipment battery adapter, comprising:
   a battery compartment having a chamber, a pair of electrical pins protruding through a top surface and a door;
   an insert, having a plurality of apertures for a plurality of commercial batteries, is placed within said chamber;
   said door having with a group of sealing rings disposed on an interior surface of said door and a means for locking to seal said compartment watertight when closed;
   a means for coupling is connected to said top surface of the compartment and a means for adapting, said coupling means having contact points for said electrical pins and a means for twist locking;
   said adapting means having a means for power management; and
   said inside surface electrically contacts the terminals of said plurality of commercial batteries, said compartment being sufficiently rugged to survive an aircraft crash landing and provide electrical power to operate said survival equipment.

2. The survival equipment battery adapter, as recited in claim 1, further comprising said door providing a bottom portion for said compartment.

3. The survival equipment battery adapter, as recited in claim 2, further comprising said door being a hinged door.

4. The survival equipment battery adapter, as recited in claim 3, further comprising said power management means having a means for surge and polarity protection, a means for voltage conversion and a means for voltage regulation.

5. The survival equipment battery adapter, as recited in claim 4, further comprising said compartment being rectangularly shaped.

6. The survival equipment battery adapter, as recited in claim 5, further comprising a plurality of inserts that vary according to the number, size and types of batteries to be installed.

7. The survival equipment battery adapter, as recited in claim 6, further comprising said plurality of commercial batteries being primary batteries.

8. The survival equipment battery adapter, as recited in claim 6, further comprising said plurality of commercial batteries being rechargeable.

9. The survival equipment battery adapter, as recited in claim 8, further comprising said locking means being a locking screw.

10. The survival equipment battery adapter, as recited in claim 9, further comprising said twist locking means fixedly connecting said coupling means to said compartment.

11. The survival equipment battery adapter, as recited in claim 10, further comprising said survival equipment being a survival radio.

12. The survival equipment battery adapter, as recited in claim 11, further comprising the survival radio being an AN/PRC-90 radio.

13. The survival equipment battery adapter, as recited in claim 10, further comprising said survival radio being an AN/PRC-112 A-C radio.

14. An AN/PRC-90 survival radio battery adapter, comprising:
    a battery compartment having a chamber, a pair of electrical pins protruding through a top surface and a door;
    an insert, having a plurality of apertures for a plurality of commercial batteries, is placed within said chamber;
    said door having with a group of sealing rings disposed on an interior surface of said door and a means for locking to seal said compartment watertight when closed;
    a means for coupling is connected to said top surface of the compartment and a means for adapting, said coupling means having contact points for said electrical pins and a means for twist locking;
    said adapting means having a means for power management; and
    said inside surface electrically contacts the terminals of said plurality of commercial batteries, said compartment being sufficiently rugged to survive an aircraft crash landing and provide electrical power to operate said survival radio.

15. The AN/PRC-90 survival radio battery adapter, as recited in claim 14, further comprising said door providing a bottom portion for said compartment.

16. The AN/PRC-90 survival radio battery adapter, as recited in claim 15, further comprising said door being a hinged door.

17. The AN/PRC-90 survival radio battery adapter, as recited in claim 16, further comprising said power management means having a means for surge and polarity protection, a means for voltage conversion and a means for voltage regulation.

18. The AN/PRC-90 survival radio battery adapter, as recited in claim 17, further comprising said compartment being rectangularly shaped.

19. The AN/PRC-90 survival radio battery adapter, as recited in claim 18, further comprising a plurality of inserts that vary according to the number, size and types of batteries to be installed.

20. The AN/PRC-90 survival radio battery adapter, as recited in claim 19, further comprising said plurality of commercial batteries being primary batteries.

21. The AN/PRC-90 survival radio battery adapter, as recited in claim 19, further comprising said plurality of commercial batteries being rechargeable.

22. The AN/PRC-90 survival radio battery adapter, as recited in claim 21, further comprising said locking means being a locking screw.

23. The AN/PRC-90 survival radio battery adapter, as recited in claim 22, further comprising said twist locking means fixedly connecting said coupling means to said compartment.

24. An AN/PRC-112 D survival radio battery adapter, comprising:
- a battery compartment having a chamber, a pair of electrical pins protruding through a top surface and a door;
- an insert, having a plurality of apertures for a plurality of commercial batteries, is placed within said chamber;
- said door having with a group of sealing rings disposed on an interior surface of said door and a means for locking to seal said compartment watertight when closed;
- a means for power management;
- said electrical pins engaging a means for connecting to said survival equipment; and
- said inside surface electrically contacts the terminals of said plurality of commercial batteries, said compartment being sufficiently rugged to survive an aircraft crash landing and provide electrical power to operate said survival equipment.

25. The AN/PRC-112 D survival radio battery adapter, as recited in claim 24, further comprising said door providing a bottom portion for said compartment.

26. The AN/PRC-112 D survival radio battery adapter, as recited in claim 25, further comprising said door being a hinged door.

27. The AN/PRC-112 D survival radio battery adapter, as recited in claim 26, further comprising said power management means being a means for surge and polarity protection.

28. The AN/PRC-112 D survival radio battery adapter, as recited in claim 27, further comprising said compartment being rectangularly shaped.

29. The AN/PRC-112 D survival radio battery adapter, as recited in claim 28, further comprising a plurality of inserts that vary according to the number, size and types of batteries to be installed.

30. The AN/PRC-112 D survival radio battery adapter, as recited in claim 29, further comprising said plurality of commercial batteries being primary batteries.

31. The AN/PRC-112 D survival radio battery adapter, as recited in claim 29, further comprising said plurality of commercial batteries being rechargeable.

32. The AN/PRC-112 D survival radio battery adapter, as recited in claim 31, further comprising said locking means being a locking screw.

33. A survival equipment battery adapter, comprising:
- a battery compartment having a chamber, a pair of electrical pins protruding through a top surface and a door;
- an insert, having a plurality of apertures for a plurality of commercial batteries, is placed within said chamber;
- said door having with a group of sealing rings disposed on an interior surface of said door and a means for locking to seal said compartment watertight when closed;
- a means for power management;
- said electrical pins engaging a means for connecting to said survival equipment; and
- said inside surface electrically contacts the terminals of said plurality of commercial batteries, said compartment being sufficiently rugged to survive an aircraft crash landing and provide electrical power to operate said survival equipment.

34. The survival equipment battery adapter, as recited in claim 33, further comprising said door providing a bottom portion for said compartment.

35. The survival equipment battery adapter, as recited in claim 34, further comprising said door being a hinged door.

36. The survival equipment battery adapter, as recited in claim 35, further comprising said power management means being a means for surge and polarity protection.

37. The survival equipment battery adapter, as recited in claim 36, further comprising said compartment being rectangularly shaped.

38. The survival equipment battery adapter, as recited in claim 37, further comprising a plurality of inserts that vary according to the number, size and types of batteries to be installed.

39. The survival equipment battery adapter, as recited in claim 38, further comprising said plurality of commercial batteries being primary batteries.

40. The survival equipment battery adapter, as recited in claim 38, further comprising said plurality of commercial batteries being rechargeable.

41. The survival equipment battery adapter, as recited in claim 40, further comprising said locking means being a locking screw.

42. The survival equipment battery adapter, as recited in claim 41, further comprising said survival equipment being a survival radio.

43. The survival equipment battery adapter, as recited in claim 42, further comprising said survival radio being an AN/PRC-112 D radio.

44. The survival equipment battery adapter, as recited in claim 35, further comprising said coupling means being connected to said top surface of the compartment and said adapting means, said coupling means having contact points for said electrical pins and a means for twist locking.

45. The survival equipment battery adapter, as recited in claim 44, further comprising said power management means being disposed within said adapting means.

46. The survival equipment battery adapter, as recited in claim 45, further comprising said power management means having a means for surge and polarity protection, a means for voltage conversion and a means for voltage regulation.

47. The survival equipment battery adapter, as recited in claim 46, further comprising said twist locking means fixedly connecting said coupling means to said compartment.

48. The survival equipment battery adapter, as recited in claim 47, further comprising the survival radio being an AN/PRC-90 radio.

49. The survival equipment battery adapter, as recited in claim 47, further comprising the survival radio being an AN/PRC-112 A-C radio.

* * * * *